United States Patent
Morgan et al.

(10) Patent No.: US 11,782,728 B2
(45) Date of Patent: Oct. 10, 2023

(54) MODULARIZED AND CUSTOMIZABLE TRANSACTION TERMINAL ARCHITECTURE

(71) Applicant: NCR Corporation, Atlanta, GA (US)

(72) Inventors: Kip Oliver Morgan, Atlanta, GA (US); Ankit Madhusudan Amin, Snellville, GA (US)

(73) Assignee: NCR Corporation, Atlanta, GA (US)

( * ) Notice: Subject to any disclaimer, the term of this patent is extended or adjusted under 35 U.S.C. 154(b) by 493 days.

(21) Appl. No.: 16/368,534

(22) Filed: Mar. 28, 2019

(65) Prior Publication Data
US 2020/0310830 A1 Oct. 1, 2020

(51) Int. Cl.
G06F 9/445 (2018.01)
G06F 9/4401 (2018.01)
G06F 9/455 (2018.01)
G06Q 20/20 (2012.01)
G06F 9/448 (2018.01)

(52) U.S. Cl.
CPC .......... *G06F 9/44505* (2013.01); *G06F 9/441* (2013.01); *G06F 9/4488* (2018.02); *G06F 9/45533* (2013.01); *G06Q 20/204* (2013.01); *G06F 2009/45562* (2013.01)

(58) Field of Classification Search
CPC ............................. G06F 9/44505; G06F 9/44
See application file for complete search history.

(56) References Cited

U.S. PATENT DOCUMENTS

| | | | | | |
|---|---|---|---|---|---|
| 5,019,963 | A | * | 5/1991 | Alderson | G06F 16/178 |
| 6,845,363 | B1 | * | 1/2005 | Matsubara | G06Q 20/20 707/999.203 |
| 2014/0012802 | A1 | * | 1/2014 | Huber | G06F 8/35 707/608 |
| 2014/0026122 | A1 | * | 1/2014 | Markande | G06F 11/3688 717/124 |

(Continued)

OTHER PUBLICATIONS

Braswell, Byron, Marc Siegel, and Le Gang Wu. Enabling the on Demand Store with IBM Store Integration Framework. IBM Redbooks, 2007. Accessed from http://www.redbooks.ibm.com/redbooks/pdfs/sg246698.pdf on Jun. 28, 2021. (Year: 2007).*

*Primary Examiner* — Raymond N Phan
(74) *Attorney, Agent, or Firm* — Schwegman Lundberg & Woessner, P.A.

(57) ABSTRACT

Modular transaction terminal services are provided. The services are customized for specific features using configuration data maintained in files. The services communicate using a standardized data format and Application Programming Interface (API). An interface is provided for custom defining an instance of a processing environment for a target transaction terminal. Customizations are made to the files and process flow data structures that are processed by the services. The hardware requirements of the target transaction terminal are also obtained and an installation package is created for the target transaction terminal. The installation package is installed on hardware of the target transaction terminal and the processing environment initiated. The services, configuration data maintained in files, process flow data structures, and interface represent a modularized and customizable transaction terminal architecture.

20 Claims, 9 Drawing Sheets

(56) References Cited

U.S. PATENT DOCUMENTS

2015/0025989 A1* 1/2015 Dunstan ............... G07F 17/329
                                                       705/18
2016/0005020 A1* 1/2016 Fernando ............. G06Q 20/202
                                                       705/21
2017/0186285 A1* 6/2017 Kakino ................ G07G 1/0072

* cited by examiner

MODULARIZED AND CUSTOMIZABLE TRANSACTION TERMINAL ARCHITECTURE

BACKGROUND

Deploying a Self-Service Terminal (SST) is a laborious task. Each store has its own backend systems and requirements in terms of security, networking, and integrated peripherals. Typically, customized engineering and programming are needed to get the SST up and running in a production mode of operation for customers of the store.

Once the customization is done, the changes may have resulted in changes to base supported services, such that additional expense is needed to support the customization and specialized programming may be needed when the base supported services are upgraded or even updated to patch discovered problems. In fact, even when the underlying Operating System (OS) upon which the base supported services is updated or patched, the specialized programming is often needed and OSs are frequently patched for security holes detected.

Customizations are often tightly coupled to the OS, the peripherals, security, and network, such that changes in any of these may necessitate re-configuration and or customized programming for the customized base services. Sometimes updates to the OS, security, and/or peripheral drives are not announced and are applied automatically over a network connection. This can result in unexpected errors or processing accuracy in the customized base services.

As a result, improved architectures for SSTs are needed.

SUMMARY

In various embodiments, methods and a system for a modularized and customized transaction terminal architecture are presented.

According to an embodiment, a method for configuring and installing a modularized and customized transaction terminal architecture is presented. Hardware settings are obtained for a terminal and an interface is provided to a modularized architecture comprising services. Customizations are received for the services. An installation package is created that defines a processing environment from the hardware settings and the customizations. The installation package is installed on the terminal with the processing environment initiated on the terminal.

DETAILED DESCRIPTION

Figure 1:
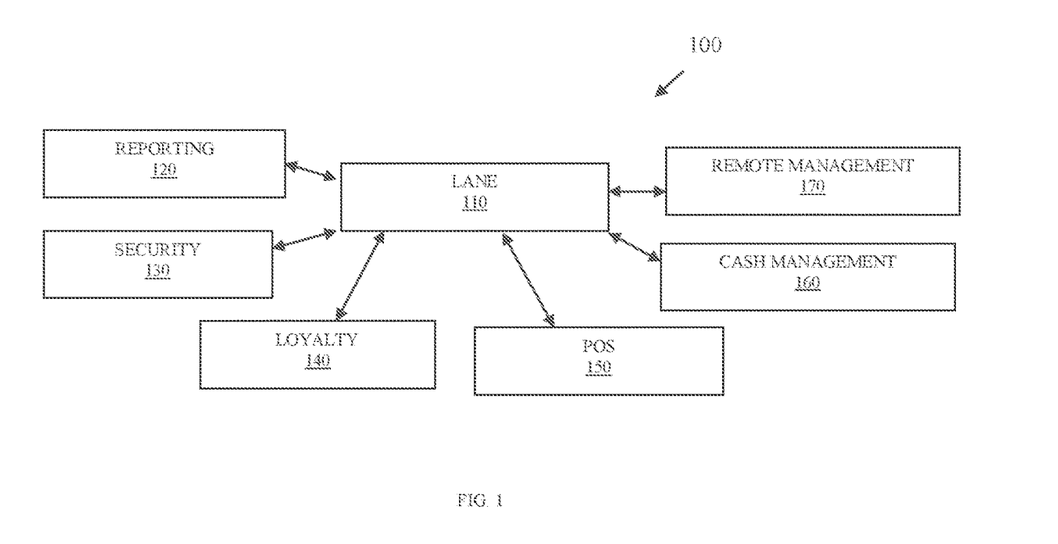
FIG. 1 is a diagram of an architecture for a modularized and customized transaction terminal architecture, according to an example embodiment.

FIG. 1 is a diagram of an architecture 100 for a modularized and customized transaction terminal architecture, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of modularized and customized transaction terminal architectures, presented herein and below.

As used herein and below, the terms "customer," "consumer," "operator," and "user" may be used interchangeably and synonymously.

The system 100 includes a plurality of processing nodes that hosts a specific set of microservices, the microservices include categories for: a lane 110, reporting 120, security 130, loyalty 140, Point-Of-Sale (POS) 150, cash management 160, and remote access management 170. The lane services 110 are directed to a plurality of features or microservices associated with a transaction terminal including peripheral services and drivers. The peripherals can include: a scanner, a bag scale, a produce scale, a touchscreen display, lighting, (tri-lights), a card reader, a currency accepter, a currency and coin dispenser, a camera, and a receipt printer. The reporting 120 is directed to a plurality of features or microservices associated with reporting transaction totals and metrics, reporting peripheral events or failures, and reporting auditing information. The security 130 is associated with a plurality of features or microservices for customer authentication, transaction authentication, item authentication based on weight and/or captured images, and other authentications. The loyalty 140 includes a plurality of features or microservices for processing loyalty accounts with a loyalty system and providing loyalty service to customers. The POS 150 is associated with a plurality of features or microservices associated with transaction processing. The cash management 160 includes a plurality of features or microservices associated with managing and authenticating currency and checks for processing as well as currency and coin denominations and totals for purposes of scheduling replenishment. The remote management 170 includes a plurality of features or microservices for remotely managing transactions at the transaction terminal and configuring the transaction terminals to operate in cashier-assisted mode of operation as a POS terminal or a self-assisted mode of operation as a SST.

Each node that hosts the microservices 110-170 may include a server or a portion of a single server dedicated to hosting specific ones of the categories of services 110-170.

Figure 2:
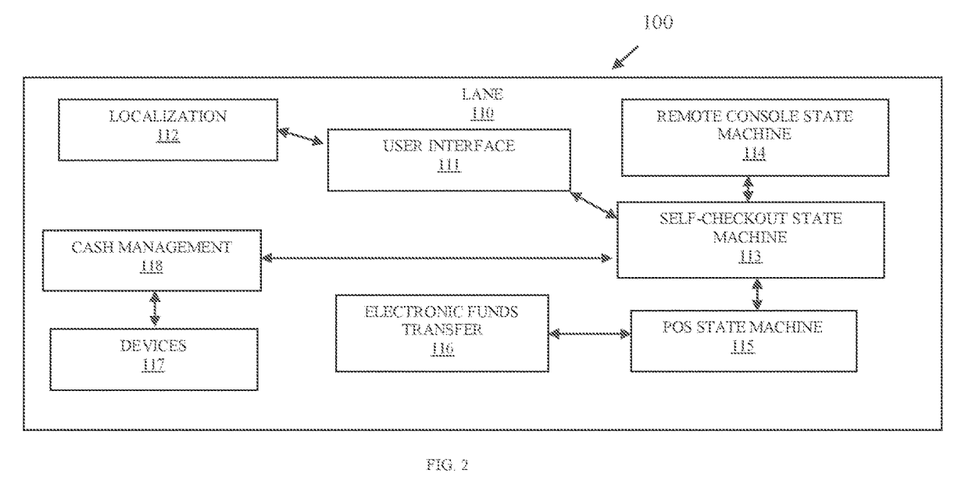
FIG. 2 is a diagram of an architecture depicting microservices for a component of the modularized and customized transaction terminal architecture, according to an example embodiment.

FIG. 2 is a diagram of an architecture 100 depicting microservices for a component of the modularized and customized transaction terminal architecture, according to an example embodiment. The lane microservice 110 can be configured in a modularized manner with features/services related to a user interface 111, localization 112, self-checkout state machine 113, remote console state machine 114, POS state machine 115, electronic funds transfer 116, devices (peripherals) 117, and cash management 118. These features/services provide a mechanism by which the services of the lane are assembled and interfaced to one another.

Figure 3:
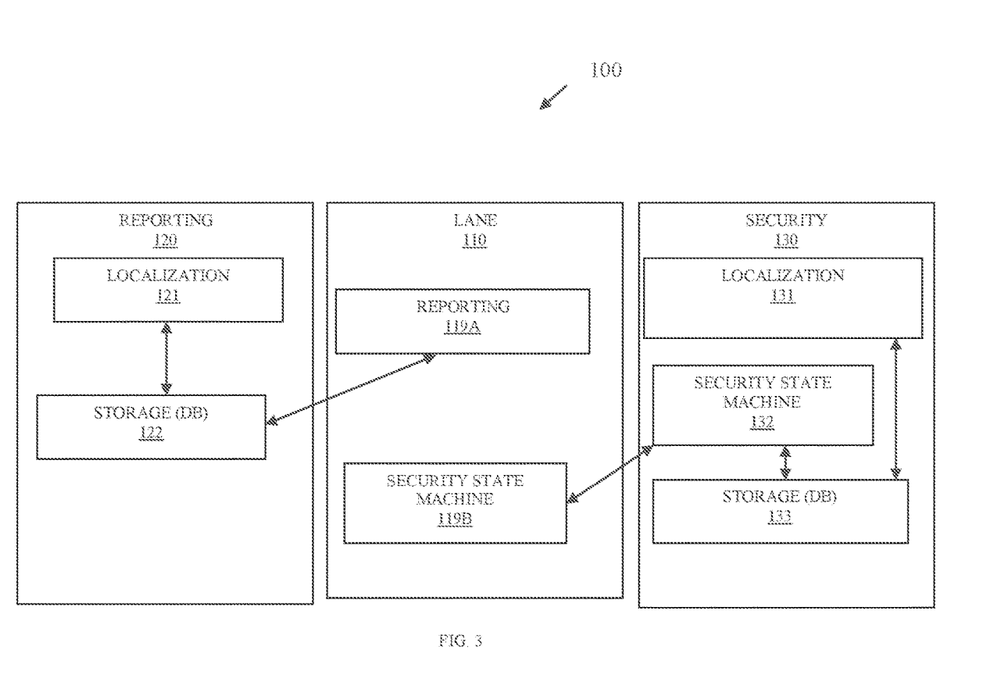
FIG. 3 is a diagram of an architecture depicting microservices for additional components of the modularized and customized transaction terminal architecture, according to an example embodiment.

FIG. 3 is a diagram of an architecture 100 depicting microservices for additional components of the modularized and customized transaction terminal architecture, according to an example embodiment. The FIG. 3 illustrates cross or inter-service interaction between the lane 110, reporting 120, and security 130 categories. The lane reporting 119A feature/service interacts with the reporting's database 122. The localization service 121 of the reporting category 120 also interacts and with the storage 122. The lane 110 also includes a security state feature/service 119B that interacts with a security state machine feature/service 132 maintained by the security category 130. The security state machine 132 also provides an interface to the localization feature/service 131 of the security category 130 through access to the common storage 133 for obtaining the security state machine 132 information.

Figure 4:
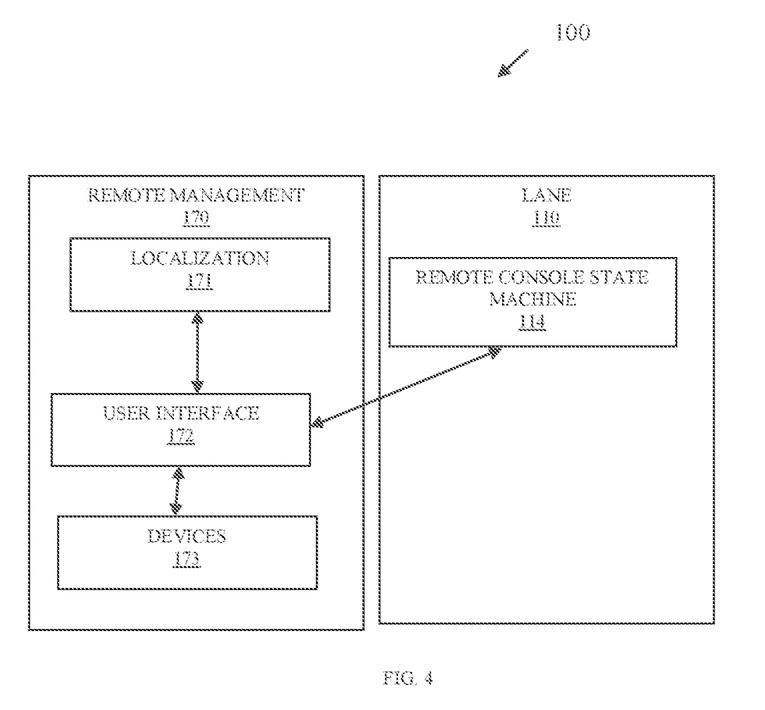
FIG. 4 is a diagram depicting still more components of the modularized and customized transaction terminal architecture, according to an example embodiment.

FIG. 4 is a diagram depicting still more components of the modularized and customized transaction terminal architecture 100, according to an example embodiment. The FIG. 4 illustrates cross or inter-service communication between the lane 110 and the remote management 170. The remote management 170 includes a localization feature/service 171, a user interface feature/service 172, and devices 173 associated with remote management for the remote management category 170. The user interface feature/service 172 provides interaction with the lane service's remote console state machine 114.

Figure 5:
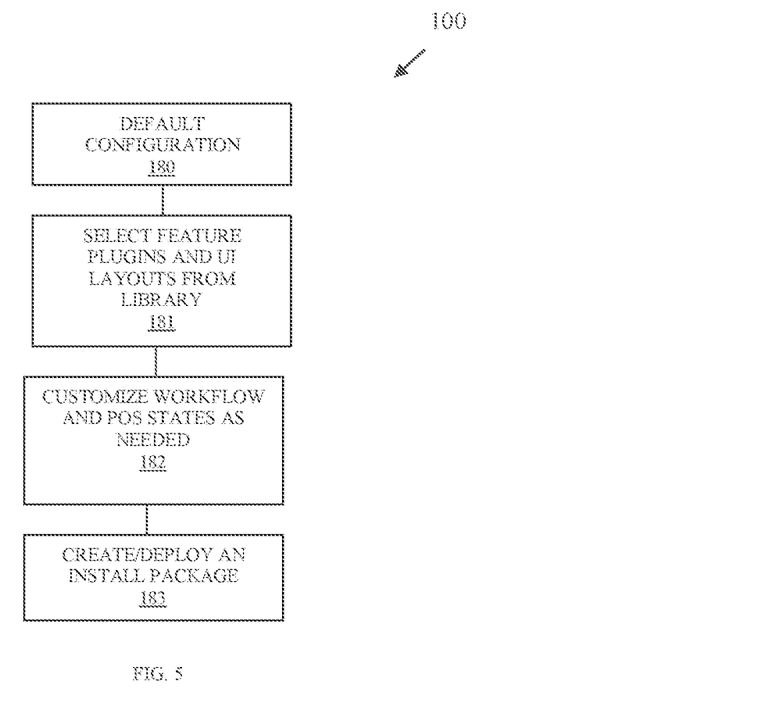
FIG. 5 is a diagram depicting a sample process flow for assembling the components with the microservices for an instance of the modularized and customized transaction terminal architecture, according to an example embodiment.

FIG. 5 is a diagram depicting a sample process flow for assembling the components with the microservices having the service features for an instance of the modularized and customized transaction terminal architecture 100, according to an example embodiment.

An interface is provided that allows a complete architecture for a given transaction terminal to be selectively assembled for the services of categories 110-170 into an installation package that can be installed on the transaction terminal as operational processing environment on that transaction terminal. A basic set of the services with selected features are provided based on standard peripherals, backend systems, and needs of a given store associated with the target transaction terminal at 180.

The interface then allows services to be selected via a default configuration at 181 along with user interface layouts that are selectable from a library. Next, a default workflow and POS transaction states can be edited/modified as needed based on desired features that are to be enabled with the base set of services at 182. Finally, at 182, the services with the selected features and modified workflow are packaged together based on the hardware and software environment known for the target transaction terminal to create an install package at 183. The install package is then deployed to the target transaction terminal and executed and a fully functioning transaction terminal is operational within a store that has been customized for the store and the terminal. No programming is needed to achieve this; rather, an interface allows for the interactive development and assembling of the needed services, their features, and workflows into a single install package.

Since no programming is needed, and the package is assembled based on selected services, features of the services, and data maintained and read in configuration files to obtain a customized instance of a processing environment, the programming code for the services is decoupled from the customized configuration. This means, the source code for base services can be maintained, supported, updated, upgraded, and provided independent of any customized processing environment for a given transaction terminal. This makes the architecture modular and customizable.

Figure 6:
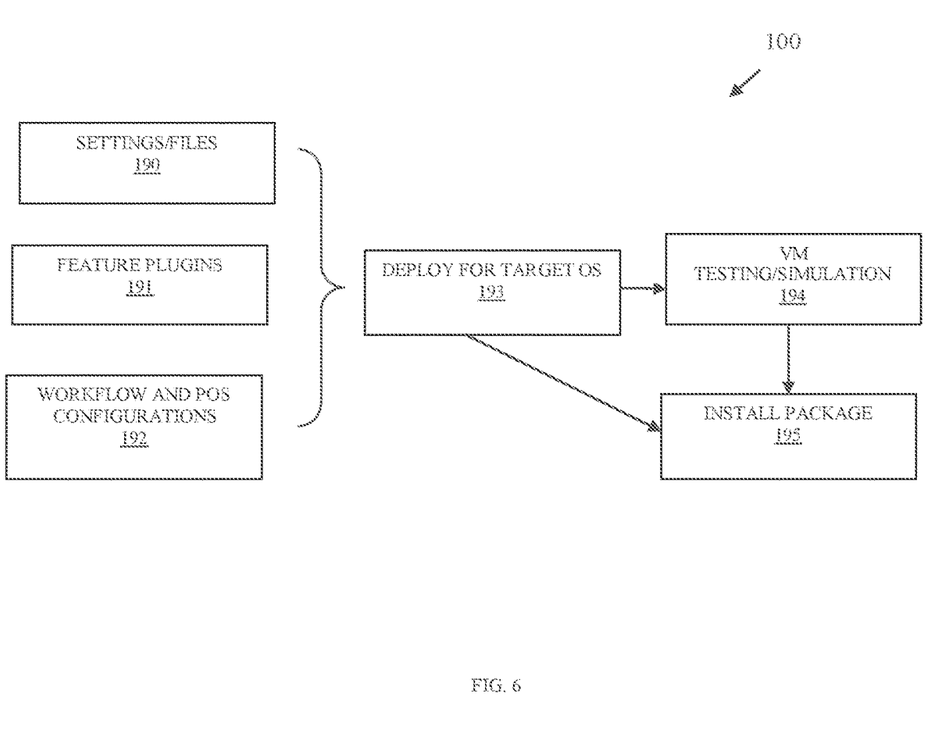
FIG. 6 is a diagram depicting another sample process flow for assembling components with the microservices for an instance of the modularized and customized transaction terminal architecture, according to an example embodiment.

FIG. 6 is a diagram depicting another sample process flow for assembling components with the microservices for an instance of the modularized and customized transaction terminal processing environment from the modularized architecture 100, according to an example embodiment. After a user operates the interface to select and assemble the services, features, and modify a default workflow, a backend to the interface creates settings/files 190, obtains the feature plugins 191, and obtains the workflow and POS configurations 192. The target OS for the target transaction terminal is acquired at 193, and the software with the configurations along with the workflows are packaged together as an install package 195.

In an embodiment, the target OS may be used along with simulated peripheral devices to establish a virtual machine (VM) at 194 on a server. The VM is initiated with the simulated peripheral devices within the target OS and the package is installed. The user is then provided access to the VM to test and verify the user's configurations. Once confirmed through the simulation that the package is ready, a modified install package (based on changes made during the simulation) is created at 195 and the install package is sent over a network connection to the target transaction terminal and automatically installed.

The services include Application Programming Interfaces (API) that use standardized data formats for communications between one another. Further, in some cases the services are provided to obtain configuration and processing from the state machines and files. This prevents a need to make customized source code changes to the services and allows the services to remain modular and removed and added in a truly plug and play fashion.

As used herein, a "processing environment" refers to a collection of services from the modular and customized architecture 100 that are configured through the files and a workflow data structure for a given hardware environment of a target transaction terminal. The processing environment includes a specific OS, specific peripheral devices, specific peripheral drivers, the configuration and settings files, the services, and the workflow data structure. Each processing environment represents a customized and user-defined instance of the modular architecture 100. The processing environment is defined and installed without programming and through an interactive interface.

In an embodiment, the transaction terminal includes: a POS terminal, a SST, an Automated Teller Machine (ATM), and/or a kiosk.

These and other embodiments are now discussed with reference to the FIGS. 7-8.

Figure 7:
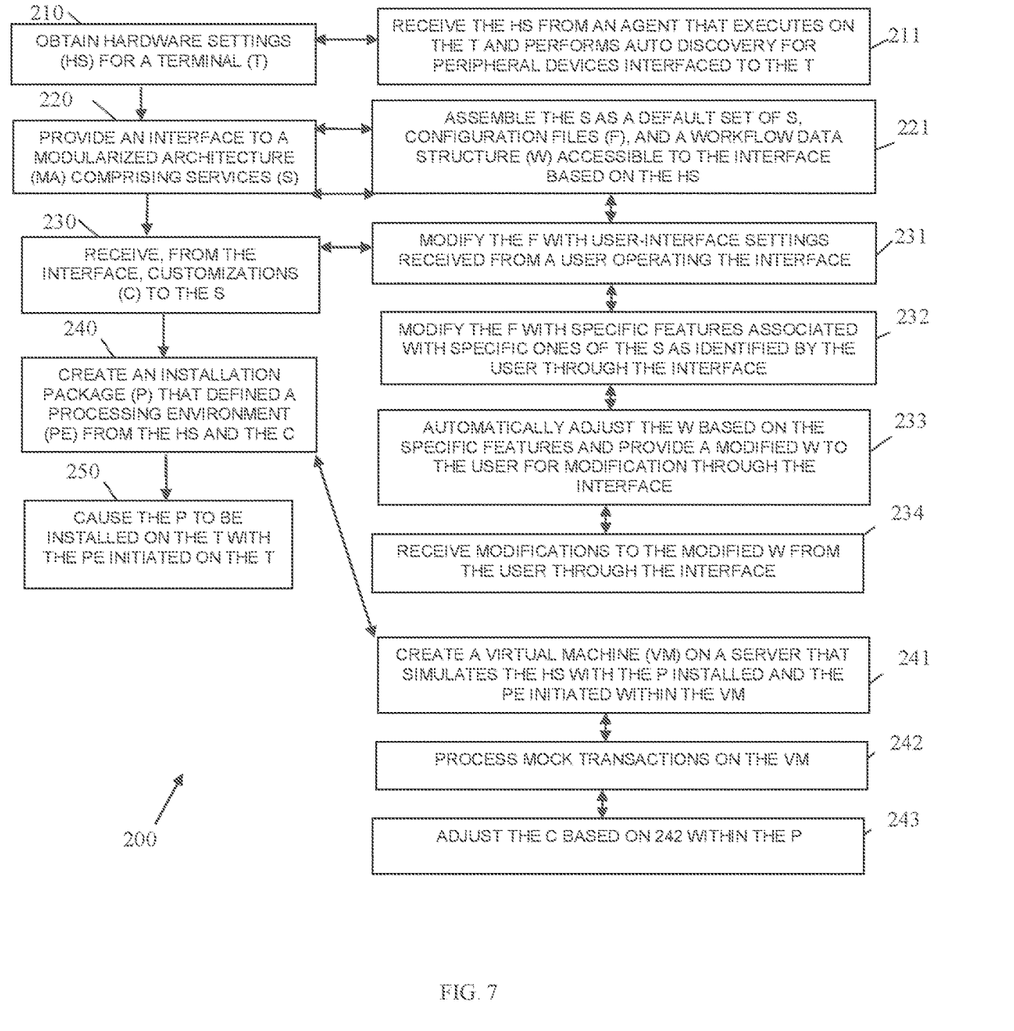
FIG. 7 is a diagram of a method for configuring and installing a modularized and customized transaction terminal architecture, according to an example embodiment.

FIG. 7 is a diagram of a method 200 for configuring and installing a modularized and customized transaction terminal architecture, according to an example embodiment. The software module(s) that implements the method 200 is referred to as a "transaction terminal processing environment creator." The transaction terminal processing environment creator is implemented as executable instructions programmed and residing within memory and/or a non-transitory computer-readable (processor-readable) storage medium and executed by one or more processors of a device. The processor(s) of the device that executes the transaction terminal processing environment creator are specifically configured and programmed to process the transaction terminal processing environment creator. The transaction terminal processing environment creator has access to one or more network connections during its processing. The network connections can be wired, wireless, or a combination of wired and wireless.

In an embodiment, the device that executes the transaction terminal processing environment creator is the server. In an embodiment, the server is a cloud-based server.

In an embodiment, the transaction terminal processing environment creator interacts with the modular services of the architecture 100 for purposes of creating a customized instance of a processing environment for a target transaction terminal. In an embodiment, the target transaction terminal is a POS terminal, a SST, an ATM, or a kiosk.

At 210, the transaction terminal processing environment creator obtains hardware settings for a terminal. The hardware settings can include device identifiers for peripherals attached to the terminal, a type and version of installed OS, available storage, network connection ports and types, available memory, processor type, and others.

In an embodiment, at 211, the transaction terminal processing environment creator receives the hardware settings from an agent that executes on the terminal and performs auto discovery for peripheral devices interfaced to the terminal.

At 220, the transaction terminal processing environment creator provides an interface to a modularized architecture 100 comprising microservices, such as the services discussed above with the FIGS. 1-6.

In an embodiment, at 221, the transaction terminal processing environment creator assembles the microservices (services) as a default set of services, configuration files, and a workflow data structure accessible to the interface based on the hardware settings. The workflow data structure defines the process flow of the default set of services and interaction of the services within the process flow.

At 230, the transaction terminal processing environment creator receives, from an interface, customization to the services associated with the default set. The interface was discussed above with the FIGS. 1-6. The interface can be text based and/or graphical based where modifications can be done through placement graphical icons and text.

In an embodiment of 221 and 230, at 231, the transaction terminal processing environment creator modifies the configuration files with user-interface settings received from a user operating the interface.

In an embodiment of 231 and at 232, the transaction terminal processing environment creator modifies the configuration files with specific features associated with specific ones of the service as identified by the user through the interface. That is, each service may include selectable functions/features that can be activated or deactivated based on user direction provided through the interface.

In an embodiment of 232 and at 233, the transaction terminal processing environment creator automatically adjusts the workflow data structure based on the specific user-provided features, and the transaction terminal processing environment creator provides a modified workflow to the user for modification through the interface.

In an embodiment of 233 and at 234, the transaction terminal processing environment creator receives modification to the modified workflow data structure from the user through the interface. In an embodiment, the workflow data structure is maintained in an eXtensible Markup Language (XML) format.

At 240, the transaction terminal processing environment creator creates an installation package that defines a processing environment from the hardware settings and the custom configurations received through the interface.

In an embodiment, at 241, the transaction terminal processing environment creator creates a Virtual Machine (VM) on a server that simulates the hardware settings with the installation package installed and the processing environment initiated within the VM.

In an embodiment of 241 and at 242, the transaction terminal processing environment creator processes mock transactions on the VM.

In an embodiment of 242 and at 243, the transaction terminal processing environment creator adjusts the custom configurations based on results or processing performance associated with the processing of the mock transactions at 242.

At 250, the transaction terminal processing environment creator causes the installation package to be installed on the terminal with the processing environment initiated on the terminal. In an embodiment, this is done over a network connection with a self-installing installation package that installs and initiates the processing environment upon being downloaded off the network onto the terminal.

Figure 8:
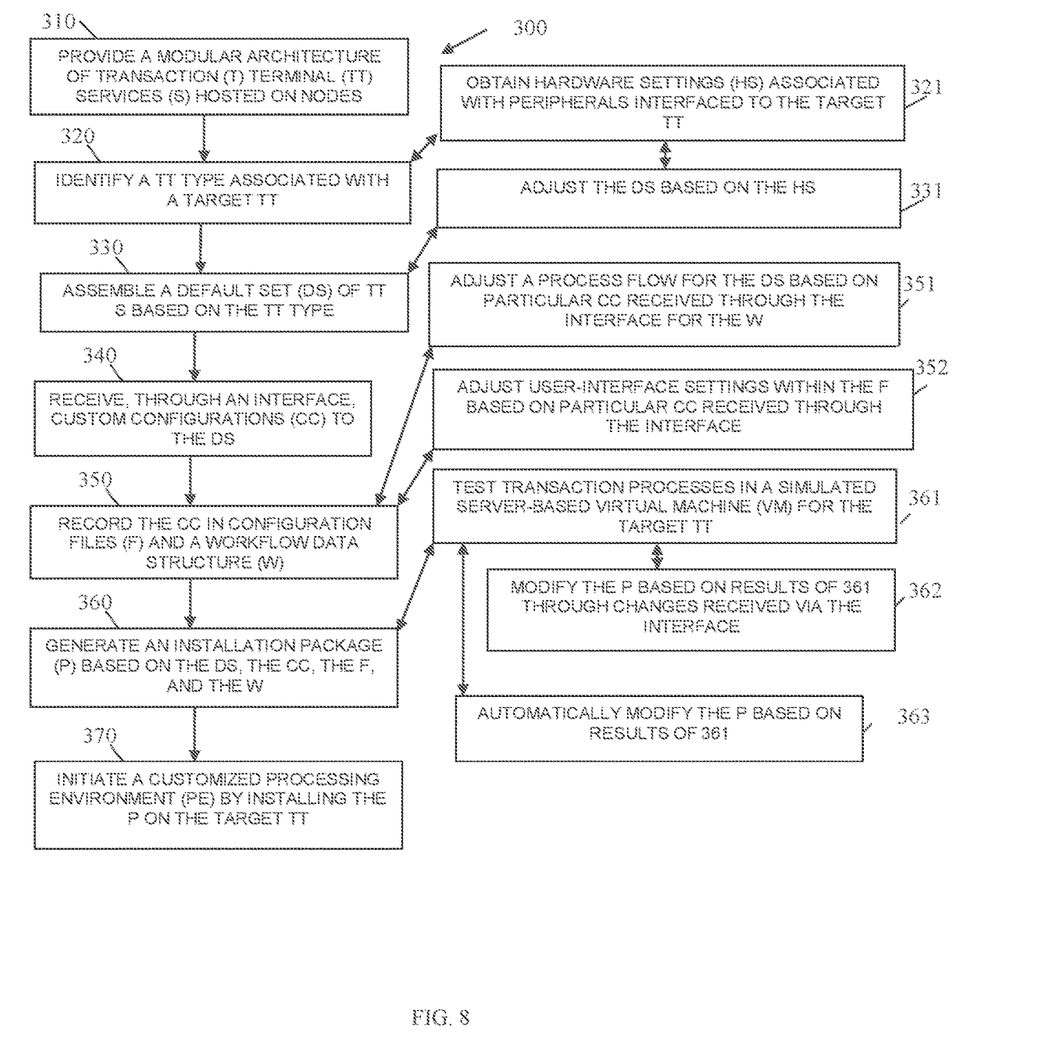
FIG. 8 is a diagram of another method for configuring and installing a modularized and customized transaction terminal architecture, according to an example embodiment.

FIG. 8 is a diagram of another method 300 for configuring and installing a modularized and customized transaction terminal architecture, according to an example embodiment. The software module(s) that implements the method 300 is referred to as a "transaction terminal architecture assembler" The transaction terminal architecture assembler is implemented as executable instructions programmed and residing within memory and/or a non-transitory computer-readable (processor-readable) storage medium and executed by one or more processors of a device. The processors that execute the transaction terminal architecture assembler are specifically configured and programmed to process the transaction terminal architecture assembler. The transaction terminal architecture assembler has access to one or more network connections during its processing. The network connections can be wired, wireless, or a combination of wired and wireless.

In an embodiment, the device that executes the transaction terminal architecture assembler is the server. In an embodiment, the server is a cloud processing environment.

In an embodiment, the transaction terminal architecture assembler interacts with the services and configuration files associated with the modular architecture 100 for purposes of installing and initiating an instance of the architecture 100 as a specific processing environment for a given transaction terminal.

In an embodiment, the transaction terminal is a POS terminal, a SST, an ATM, and/or a kiosk.

The transaction terminal architecture assembler presents another and in some ways enhanced processing perspective of the method 200 discussed above.

At 310, the transaction terminal architecture assembler provides a modular architecture 100 of transaction terminal services hosted on nodes of a network.

At 320, the transaction terminal architecture assembler identifies a transaction terminal type associated with a given target transaction terminal.

In an embodiment, at 321, the transaction terminal architecture assembler obtains hardware settings associated with peripherals interfaced to the target transaction terminal. In an embodiment, this is done via an agent that executes on the target transaction terminal and performs auto device discovery.

At 330, the transaction terminal architecture assembler assembles a default set of transaction terminal services based on the transaction terminal type.

In an embodiment of 321 and 330, at 331, the transaction terminal architecture assembler adjusts the default set of transaction terminal services based on the hardware settings of the target transaction terminal.

At 340, the transaction terminal architecture assembler receives, through an interface, custom configurations to the default set of services.

At 350, the transaction terminal architecture assembler records the custom configurations in configuration files and a workflow data structure. The workflow data structure provided with the default service and defines a process flow between the default set of services.

In an embodiment, at 351, the transaction terminal architecture assembler adjusts a process flow for the default set of services based on particular customized customizations through the interface for the workflow.

In an embodiment, at 352, the transaction terminal architecture assembler adjusts user-interface settings within the configuration files based on particular customized configurations received through the interface.

At 360, the transaction terminal architecture assembler generates an installation package based on the default services, the customized configurations, the configuration files, and the workflow data structure.

In an embodiment, at 361, the transaction terminal architecture assembler tests transaction processes in a simulated server-based VM for the target transaction terminal.

In an embodiment of 361 and at 362, the transaction terminal architecture assembler modifies the installation package based on results of the testing at 361 through changes received to the customized configurations through the interface.

In an embodiment of 361 and at 363, the transaction terminal architecture assembler automatically modifies the installation package based on results of the testing. Unlike the embodiment of 362, changes here are entirely automated based on results of the testing and made without receiving the changes through the interface.

At 370, the transaction terminal architecture assembler initiates a customized processing environment by installing the installation package on the target transaction terminal.

Figure 9:
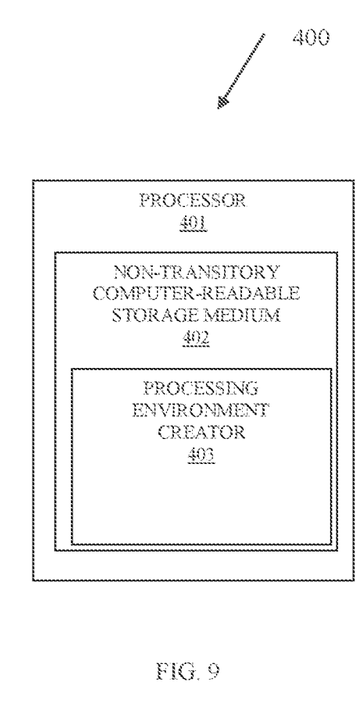
FIG. 9 is a diagram of a system for configuring and installing a modularized and customized transaction terminal architecture, according to an example embodiment.

FIG. 9 is a diagram of a system 400 for configuring and installing a modularized and customized transaction terminal architecture, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-8.

The system 400 includes a processor 401, a non-transitory computer-readable storage medium 402 having executable instructions representing a processing environment creator 403.

The processing environment creator 403 when executed from the non-transitory computer-readable storage medium 402 by the processor 401 is configured to cause the processor 401 to: provide a default set of transaction services based on a target transaction terminal; provide a default workflow data structure for a processing flow of the default set; receive, through an interface, feature selections and configurations to the default set recorded in files; receive, through the interface, modifications to the processing flow recorded in a modified workflow data structure; create an installation package based on the target transaction terminal, the default set, the filed, and the modified workflow data structure; and cause a customized processing environment to be initiated on the target transaction terminal by installing the installation package on the target transaction terminal.

In an embodiment, the processing environment creator 403 when executed from the non-transitory computer-readable storage medium 402 by the processor 401 is further configured to cause the processor 401 to: provide a virtual machine that simulates hardware of the target transaction terminal and that has the installation package installed for testing transactions associated with the customized processing environment before installing the installation package on the target transaction terminal.

In an embodiment, the processing environment creator 403 performs the processing discussed above with respect to the interface discussed in the FIGS. 1-6, the method 200 of the FIG. 7, and/or the method 300 of the FIG. 8.

In an embodiment, the transaction terminal is a POS terminal, a SST, an ATM, and/or a kiosk.

In an embodiment, the modular services are any of the modular microservices discussed above with the FIGS. 1-6.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   obtaining hardware settings for a terminal;
   providing an interface to a modularized architecture comprising services;
   receiving, from the interface, customizations to the services, wherein the services at least comprise lane services, security services, and cash management services, wherein the lane services comprises lane micro services comprising first customized features for a scanner, a bag scale, a produce scale, a touchscreen display, tri-lights, a card reader, a currency acceptor, a currency and coin dispenser, a camera, a receipt printer, and a security state service that provides security state machine information for the scanner, the bag scale, the produce scale, the touchscreen display, the tri-lights, the card reader, the currency accepter, the currency and coin dispense, the camera, and the receipt printer, wherein the security services comprises security micro services comprising second customized features for customer authentication, transaction authentication, and item authentication based on weight and captured item images, wherein the cash management services comprise cash management micro services comprising third customized features for managing and authenticating currency, processing checks, managing currency and coin denomination totals for scheduling of currency replenishment;
   creating an installation package that defines a processing environment from the hardware settings and the customizations;
   causing the installation package to be installed on the terminal with the processing environment initiated on the terminal; and
   maintaining source code for the services separate and independent of the customizations for the processing environment by maintaining configuration files and a workflow data structure for the customizations and by the services processing the configuration files and the workflow data structure to initiate the processing environment on the terminal as a customized instance of the processing environment for the terminal, wherein the processing environment is defined and created through the interface and the processing environment is installed and initiated on the terminal without any programming, wherein the configuration files include user interface layouts for a user interface associated with the installed and initiated processing environment on the terminal.

2. The method of claim 1, wherein obtaining further includes receiving the hardware settings from an agent that executes on the terminal and performs auto discovery for peripheral devices interfaced to the terminal.

3. The method of claim 1, wherein providing further includes assembling the services as a default set of services, the configuration files, and the workflow data structure accessible to the interface based on the hardware settings.

4. The method of claim 1, wherein creating further includes creating a virtual machine on a server that simulates the hardware settings with the installation package installed and the processing environment initiated within the virtual machine.

5. The method of claim 3, wherein receiving further includes modifying the configuration files with user-interface settings received from a user operating the interface.

6. The method of claim 4, wherein creating the virtual machine further includes processing mock transactions on the virtual machine.

7. The method of claim 5, wherein modifying further includes modifying the configuration files with specific features associated with specific ones of the services as identified by the user through the interface.

8. The method of claim 6, wherein processing further includes adjusting the customizations based on the processing within the installation package.

9. The method of claim 7, wherein modifying further includes automatically adjusting the workflow data structure based on the specific features and providing the modified workflow data structure to the user for modification through the interface.

10. The method of claim 9, wherein automatically adjusting further includes receiving modifications to the modified workflow data structure from the user through the interface.

11. A method, comprising:
    providing a modular architecture of transaction terminal services hosted on nodes of a network, wherein the transaction terminal services at least comprise lane services, security services, and cash management services, wherein the lane services comprises lane micro services comprising first customized features for a scanner, a bag scale, a produce scale, a touchscreen display, tri-lights, a card reader, a currency acceptor, a currency and coin dispenser, a camera, a receipt printer, and a security state service that provides security state machine information for the scanner, the bag scale, the produce scale, the touchscreen display, the tri-lights, the card reader, the currency accepter, the currency and coin dispense, the camera, and the receipt printer, wherein the security services comprises security micro services comprising second customized features for customer authentication, transaction authentication, and item authentication based on weight and captured item images, wherein the cash management services comprise cash management micro services comprising third customized features for managing and authenticating currency, processing checks, managing currency and coin denomination totals for scheduling of currency replenishment;
    identifying a transaction terminal type associated with a target transaction terminal;
    assembling a default set of the transaction terminal services based on the transaction terminal type;
    receiving, through an interface, customized configurations to a default set;
    recording the customized configurations in configuration files and a workflow data structure;
    generating an installation package based on the default set, the customized configurations, the configuration files, and the workflow data structure;
    initiating a customized processing environment on the target transaction terminal by installing the installation package on the target transaction terminal; and
    maintaining source code for the default set of transaction terminal services separate and independent of the customizations for the customized processing environment by maintaining the configuration files and the workflow data structure for the custom configurations and by the default set of transaction terminal services processing the configuration files and the workflow data structure to initiate the customized processing environment on the target transaction terminal as a customized instance of the customized processing environment for the target transaction terminal, wherein the customized processing environment is defined and created through the interface and the customized processing environment is installed and initiated on the terminal without any programming, wherein the configuration files include user interface layouts for a user interface associated with the installed and initiated processing environment on the terminal.

12. The method of claim 11, wherein identifying further includes obtaining hardware settings associated with peripherals interfaced to the target transaction terminal.

13. The method of claim 11, wherein recording further includes adjusting a process flow for the default set based on particular custom configurations received through the interface for the workflow data structure.

14. The method of claim 11, wherein recording further includes adjusting user-interface settings within the configuration files based on particular custom configurations received through the interface.

15. The method of claim 11, wherein generating further includes testing transaction processes in a simulated server-based virtual machine for the target transaction terminal.

16. The method of claim 12, wherein assembling further includes adjusting the default set based on the hardware settings.

17. The method of claim 15, wherein testing further includes modifying the installation package based on results of the testing through changes received via the interface.

18. The method of claim 15, wherein testing further includes automatically modifying the installation package based on results of the testing.

19. A system, comprising:
a processor;
a non-transitory computer-readable storage medium having executable instructions representing a processing environment creator; and
the processing environment creator when executed by the processor from the non-transitory computer-readable storage medium cause the processor to:
provide a default set of transaction services based on a target transaction terminal, wherein the default set of transaction services at least comprise lane services, security services, and cash management services, wherein the lane services comprises lane micro services comprising first customized features for a scanner, a bag scale, a produce scale, a touchscreen display, tri-lights, a card reader, a currency acceptor, a currency and coin dispenser, a camera, a receipt printer, and a security state service that provides security state machine information for the scanner, the bag scale, the produce scale, the touchscreen display, the tri-lights, the card reader, the currency accepter, the currency and coin dispense, the camera, and the receipt printer, wherein the security services comprises security micro services comprising second customized features for customer authentication, transaction authentication, and item authentication based on weight and captured item images, wherein the cash management services comprise cash management micro services comprising third customized features for managing and authenticating currency, processing checks, managing currency and coin denomination totals for scheduling of currency replenishment;
provide a default workflow data structure for a processing flow of the default set;
receive, through an interface, feature selections and configurations to the default set recorded in files;
receive, through the interface, modifications to the processing flow recorded in a modified workflow data structure;
create an installation package based on the target transaction terminal, the default set, the files, and the modified workflow data structure;
cause a customized processing environment to be initiated on the target transaction terminal by installing the installation package on the target transaction terminal; and
maintaining source code for the default set of transaction terminal services separate and independent of the configurations for the customized processing environment by maintaining configuration files and the modified workflow data structure for the configurations and by the default set of transaction terminal services processing the configuration files and the workflow data structure to initiate the customized processing environment on the target transaction terminal as a customized instance of the customized processing environment for the target transaction terminal, wherein the customized instance of the customized processing environment is defined and created through the interface and the customized instance of the customized processing environment is installed and initiated on the terminal without any programming, wherein the configuration files include user interface layouts for a user interface associated with the installed and initiated processing environment on the terminal.

20. The system of claim 19, wherein the processing environment creator is further configured to cause the processor to: provide a virtual machine that simulates hardware of the target transaction terminal and that has the installation package installed for testing transactions associated with the customized processing environment before installing the installation package on the target transaction terminal.

* * * * *